United States Patent [19]
Kao

[11] Patent Number: 6,144,551
[45] Date of Patent: Nov. 7, 2000

[54] DATA INPUT DEVICE WITH FOLDABLE COVER

[75] Inventor: George Kao, Taipei, Taiwan

[73] Assignee: Peripheral Technology Inc., Taipei, Taiwan

[21] Appl. No.: 09/232,145

[22] Filed: Jan. 15, 1999

[30] Foreign Application Priority Data

Oct. 20, 1998 [TW] Taiwan .................. 87217316

[51] Int. Cl.⁷ .................................... G06F 1/16

[52] U.S. Cl. .......................... 361/681; 345/905

[58] Field of Search ................... 361/680, 681; 345/905

[56] References Cited

U.S. PATENT DOCUMENTS

5,677,827  10/1997  Yoshioka et al. .
5,926,364   7/1999  Karidis ............................ 361/681
5,941,648   8/1999  Robinson et al. .

Primary Examiner—Jeffrey Donels
Attorney, Agent, or Firm—Ladas & Parry

[57] ABSTRACT

A foldable data input device includes a keyboard, a hinge device and a lid. The keyboard is formed with a top face and opposing first and second side edges and has a plurality of keys mounted on the top face and a signal transmission device mounted on the keyboard. The lid is connected pivotally to the first side edge of the keyboard by the hinge device in order to cover the top face of the keyboard. The lid further has an inside face for confronting the top face, a touch pad and selection buttons provided on the inside face.

11 Claims, 14 Drawing Sheets

DATA INPUT DEVICE WITH FOLDABLE COVER

BACKGROUND OF THE INVENTION

1. Field of the Invention

This invention relates to a data input device, more particularly to a foldable data input device.

2. Description of the Related Art

Figure 1:
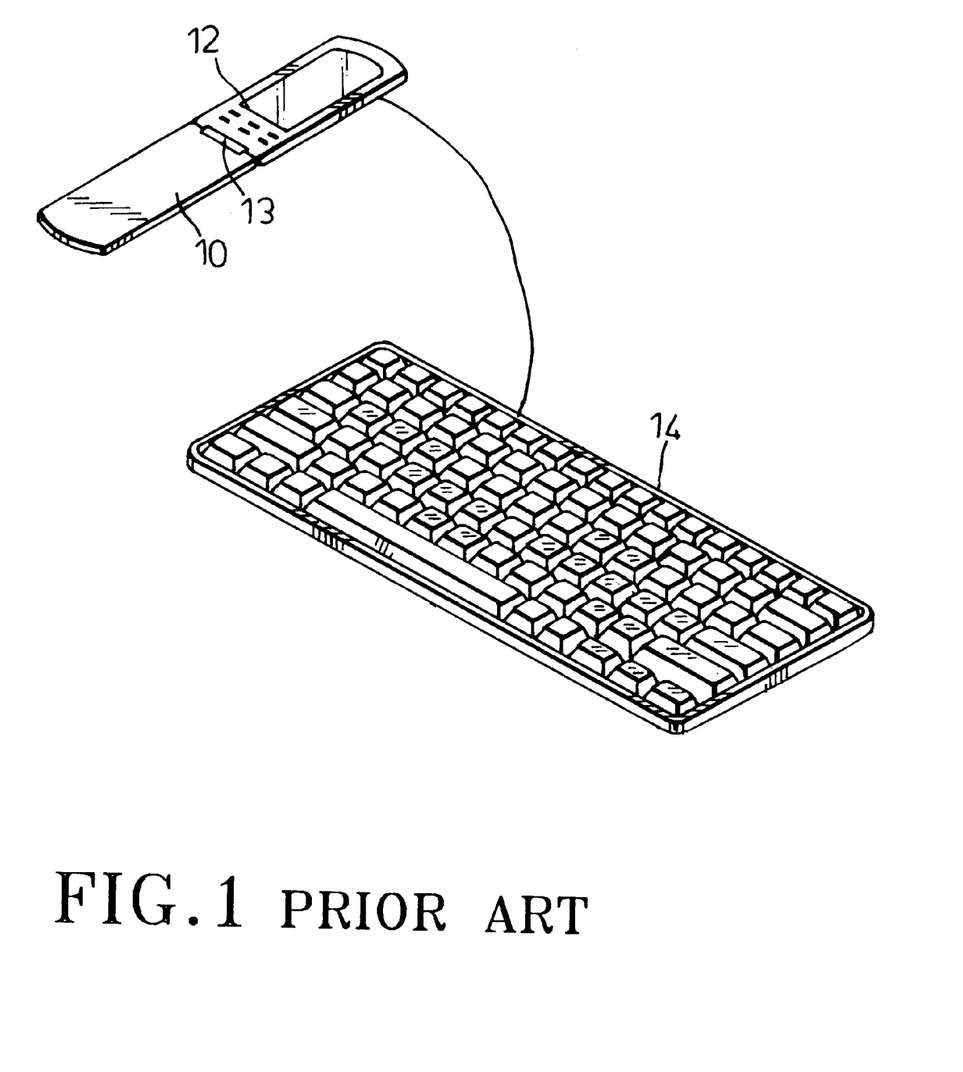
FIG. 1 is a perspective view of a conventional PDA having a keyboard connected thereto.

Referring to FIG. 1, a conventional Personal Digital Assistant (PDA) is shown to comprise a lid member 10 and a liquid crystal display 12. The lid member 10 has a hinge device 13 at a side edge thereof to connect pivotally with the liquid crystal display 12. The liquid crystal display 12 has a touch panel from which the user can input data. Since the PDA is designed for easy carrying, the user can only input data in a simple form by pressing selected areas on the touch panel of the liquid crystal display 12. When the user wants to input complicated characters or input quickly characters or figures, a keyboard 14 is required. However, the keyboard 14 is bulky and is not easy to carry, thereby inconveniencing the user.

Figure 2:
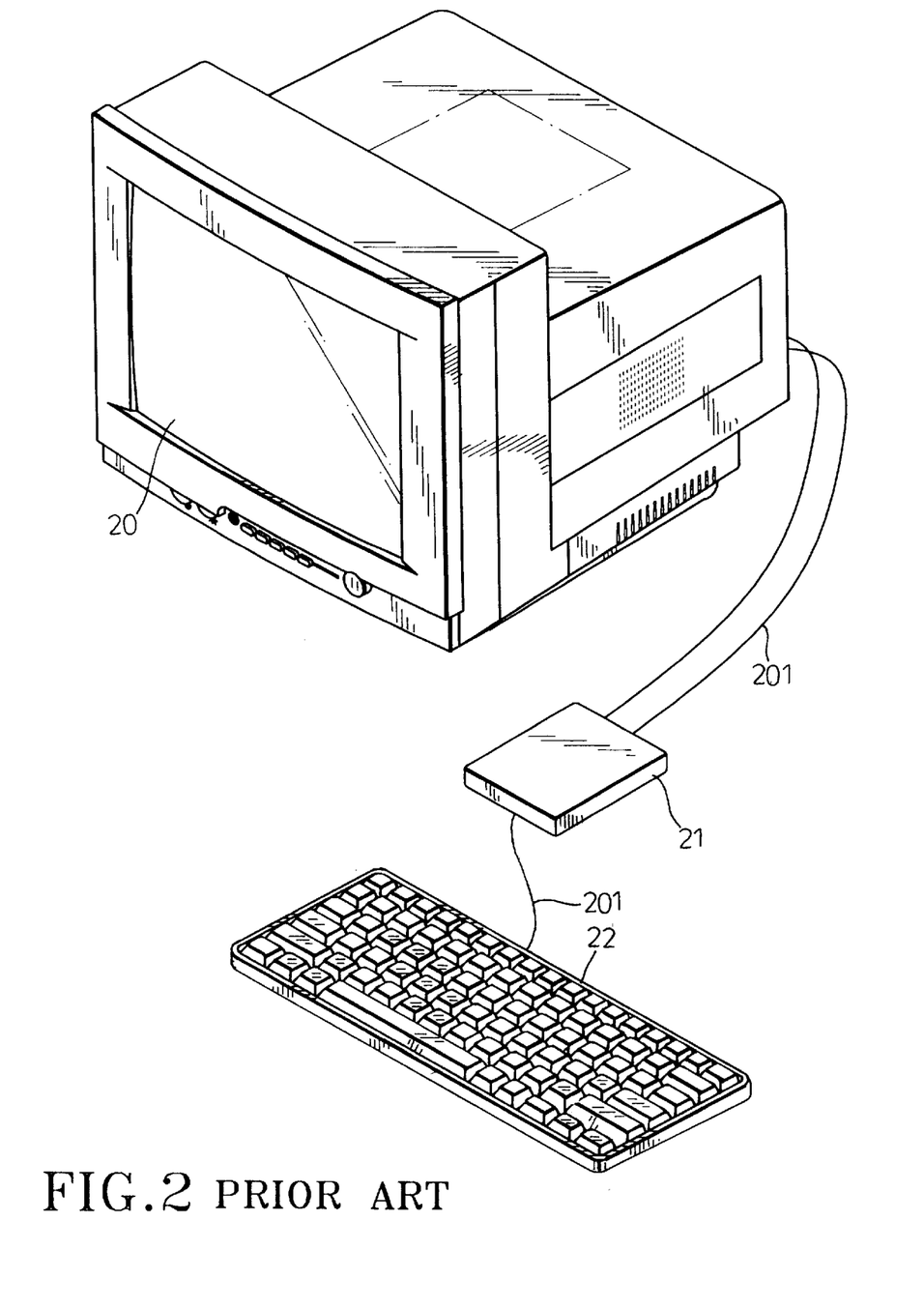
FIG. 2 is a perspective view of a conventional digital telecommunication system having a keyboard connected thereto.
Figure 3:
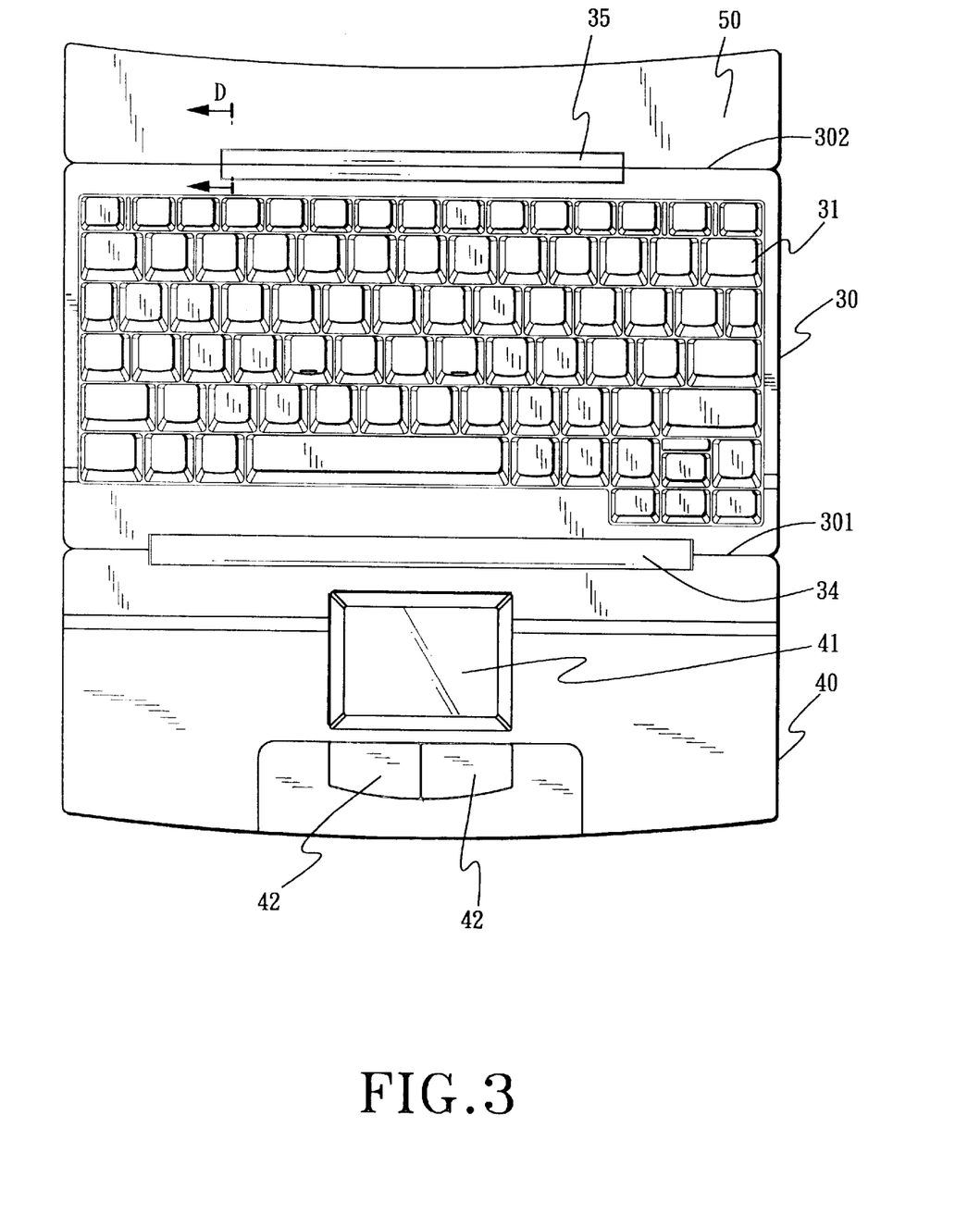
FIG. 3 is a top view of a preferred embodiment of a foldable data input device according to the present invention in an unfolded position.

Referring FIG. 2, a conventional digital telecommunication system is shown to comprise a digital television 20, a modem 21 and a keyboard 22. The digital television 20 is connected to the modem 21 and the keyboard 22 by signal cables 201 or by infrared transmission means (not shown). When the user wants to connect to a network, the modem 21 is activated. Then, the user can input data by means of the keyboard 22. Since the keyboard 22 is bulky and is not easy to store, it is often placed on a desk when not in use. Therefore, the keyboard 22 is liable to be contaminated by dirt, dust, etc.

Further, the input devices for laptop computers include, for example, a keyboard, computer mouse and touch pad which are connected to the computer by means of cables that occupy a large amount of space on the desk.

SUMMARY OF THE INVENTION

The object of the present invention is to provide a foldable data input device that is easy to carry and store and that can perform data input functions in a number of different ways.

According to the present invention, the foldable data input device comprises a keyboard, a hinge device and a lid. The keyboard is formed with a top face and opposing first and second side edges, and has a plurality of keys mounted on the top face and a signal transmission device mounted thereon. The lid is connected pivotally to the first side edge of the keyboard by the hinge device in order to cover the top face of the keyboard. The lid further has an inside face for confronting the top face. A touch pad and selection buttons are provided on the inside face.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Before the present invention is disclosed in greater detail, it should be noted that like elements are denoted by the same reference numerals throughout the disclosure.

Referring to FIG. 3 and FIGS. 4A to 4D, a first preferred embodiment of an input data device according to the present invention is shown to comprise a keyboard 30, a first lid 40 and a second lid 50.

The keyboard 30 has a plurality of keys 31, and an infrared receiver/emitter device 32 and a cable signal transmission device 33 mounted on the rear face thereof. The keyboard 30 further has a first hinge device 34 and a second hinge device 35 at opposite first and second side edges 301, 302 thereof, respectively, in order to connect pivotally the first and second lids 40, 50 to the keyboard 30. The first lid 40 has a touch pad 41, a pair of first selection buttons 42 provided on an inside face of the first lid 40, and a press-type cursor control device 43 and a pair of second selection buttons 44 that are operatively associated with the press-type cursor control device 43, which are provided on an outside face of the first lid 40.

Figure 5:
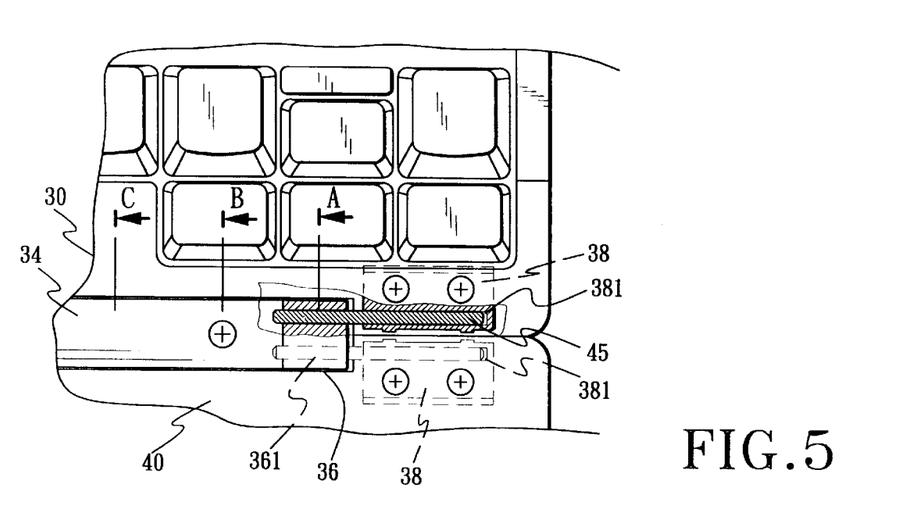
FIG. 5 is a fragmentary cross sectional view illustrating a first hinge device of the preferred embodiment.

Since the structure of the first and second hinge devices 34, 35 are the same, only the structure of the first hinge device 34 will be discussed in greater detail hereinbelow. With reference to FIG. 5, the first hinge device 34 has two pairs of hinge leaves 38 which are disposed between and which are connected pivotally to the first side edge 301 of the keyboard 30. Each pair of hinge leaves 38 have two pivot holes 381 formed therein.

Figure 6A:
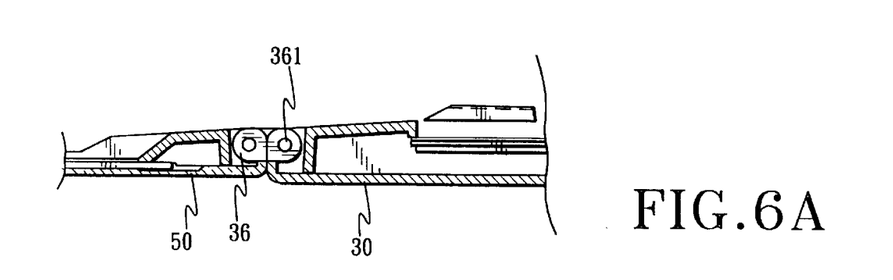
FIG. 6A is a fragmentary cross sectional view taken along the line A—A in FIG. 5.
Figure 6B:
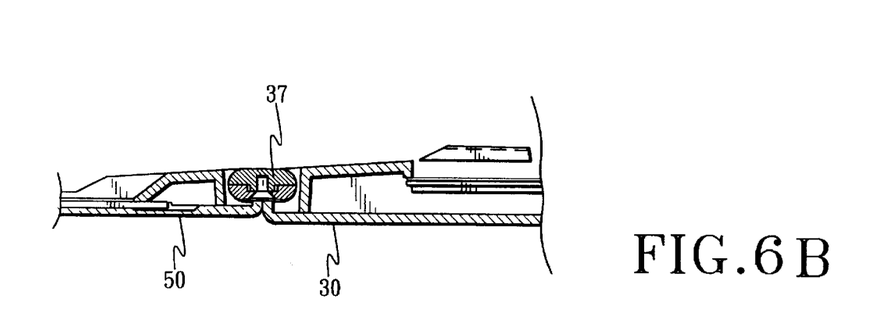
FIG. 6B is a fragmentary cross sectional view taken along the line B—B in FIG. 5.

Referring to FIGS. 5, 6A and 6B, a pair of elongated guide plates 37 are disposed between and are connected pivotally to the two pairs of hinge leaves 38 via two pairs of pivot pins 45 that engage two pairs of pivot hole 361 in two opposite ends of the guide plates 37 (only one pair is shown) and that engage the pivot holes 381 in the hinge leaves 38. In this way, the first lid 40 can be pivoted to the first side edge 301 of the keyboard 30. The second lid 50 can be pivoted to the second side edge 302 of the keyboard 30 in a similar manner. Therefore, the first and second lids 40, 50 are foldable over the top face of the keyboard 30 on the same plane in order to protect the top face of the keyboard 30 from dirt, dust, etc., as best illustrated in FIG. 4B.

Figure 6C:
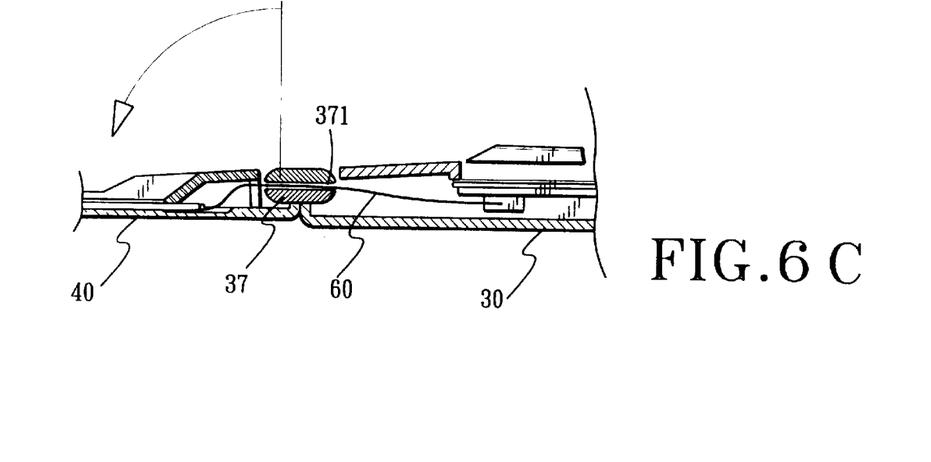
FIG. 6C is a fragmentary cross sectional view taken along the line C—C in FIG. 5.
Figure 6D:
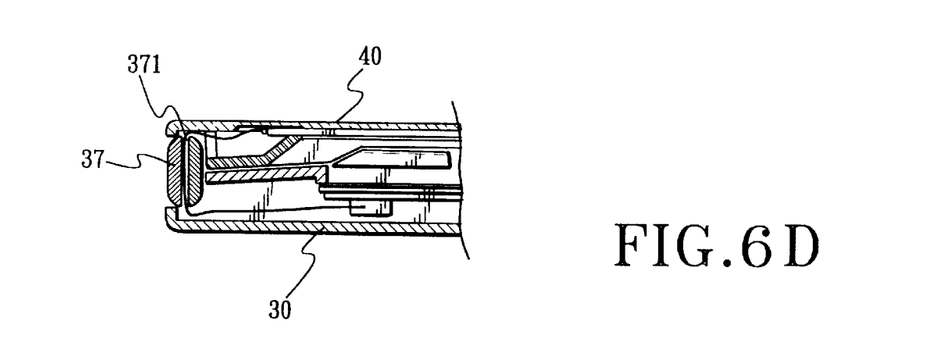
FIGS. 6D and 6E are schematic views illustrating a first lid and a keyboard of the preferred embodiment, in which the first lid is folded onto the keyboard and is rotated to a vertical position with respect to the keyboard, respectively.
Figure 6E:
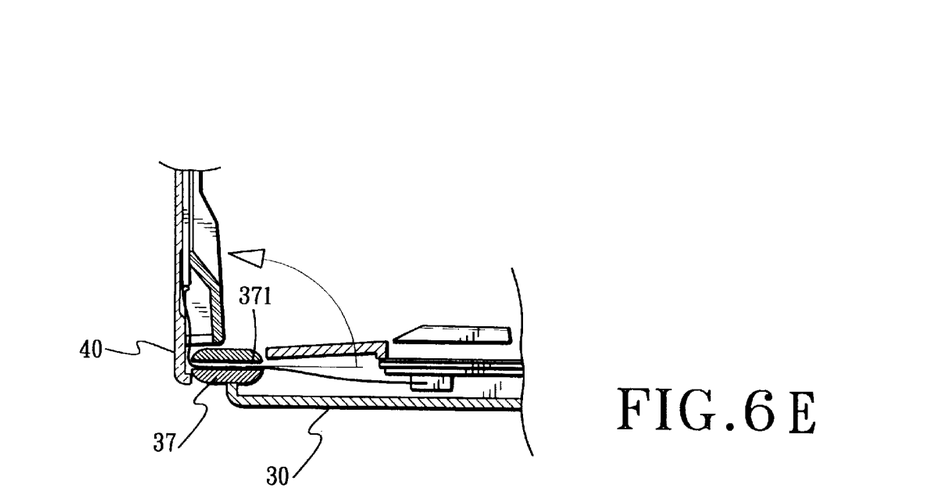

Referring to FIGS. 6C to 6E, the guide plates 37 are fastened to one another and have a gap 371 formed therebetween for guiding signal transmission lines 60 that are connected electrically to the keyboard 30, the touch pad 41, the first selection buttons 42, the cursor control device 43 and the second selection buttons 44. Therefore, when the first lid 40 is rotated with respect to the keyboard 30, the signal transmission lines 60 will not be depressed by the guide plates 37 in order to prolong the service life thereof, as best illustrated in FIGS. 6C, 6D and 6E.

Figure 6F:
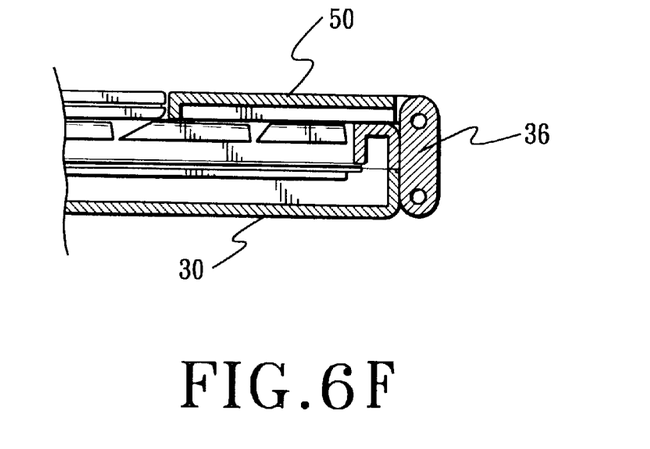
FIGS. 6F to 6I are fragmentary cross sectional views taken along the line D—D in FIG. 3, illustrating the consecutive pivoting actions of a second lid relative to the keyboard of the preferred embodiment according the present invention.
Figure 6G:
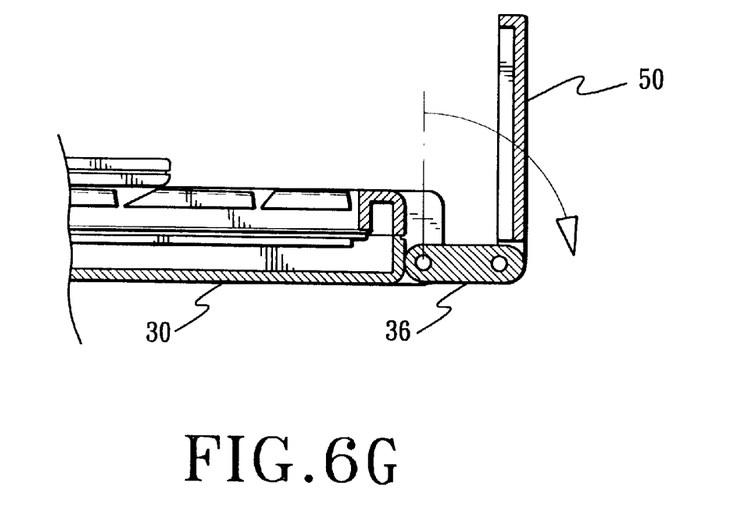
Figure 6H:
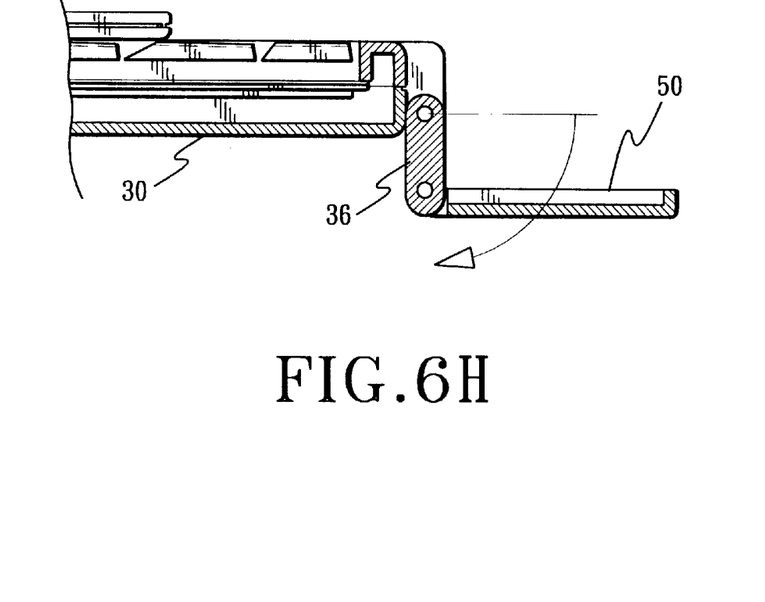
Figure 6I:
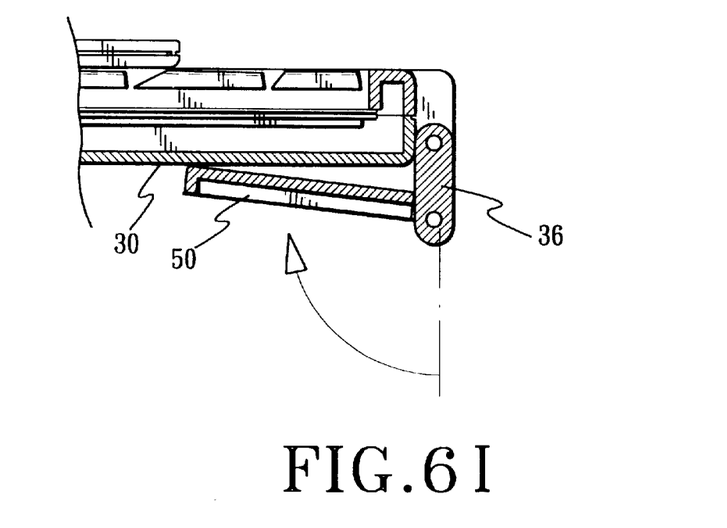
Figure 7:
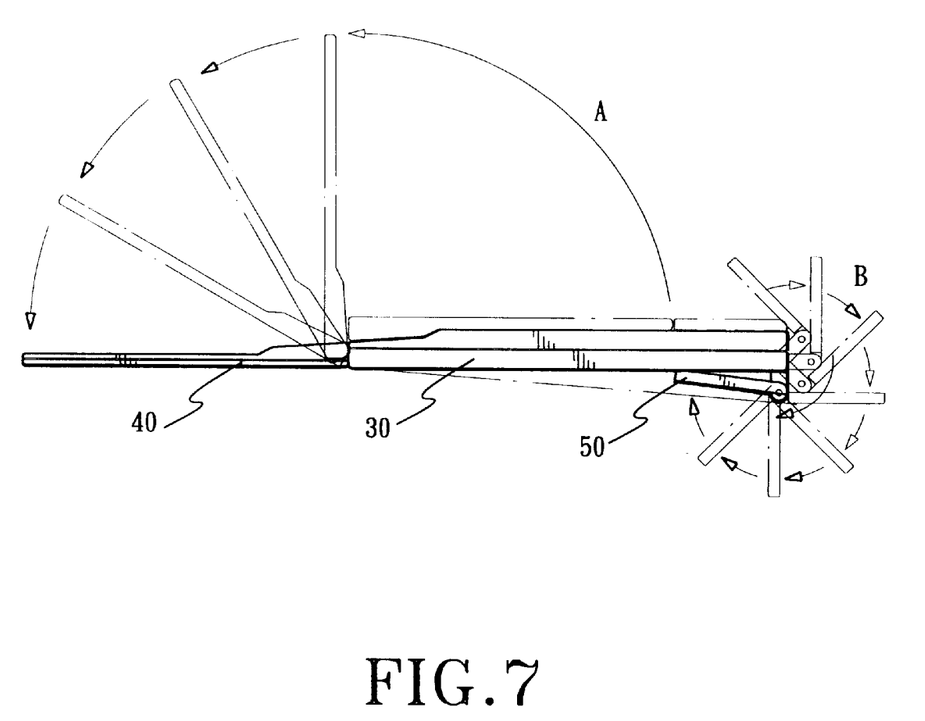
FIG. 7 is a schematic view illustrating the rotation of the first and second lids relative to the keyboard of the preferred embodiment.
Figure 8:
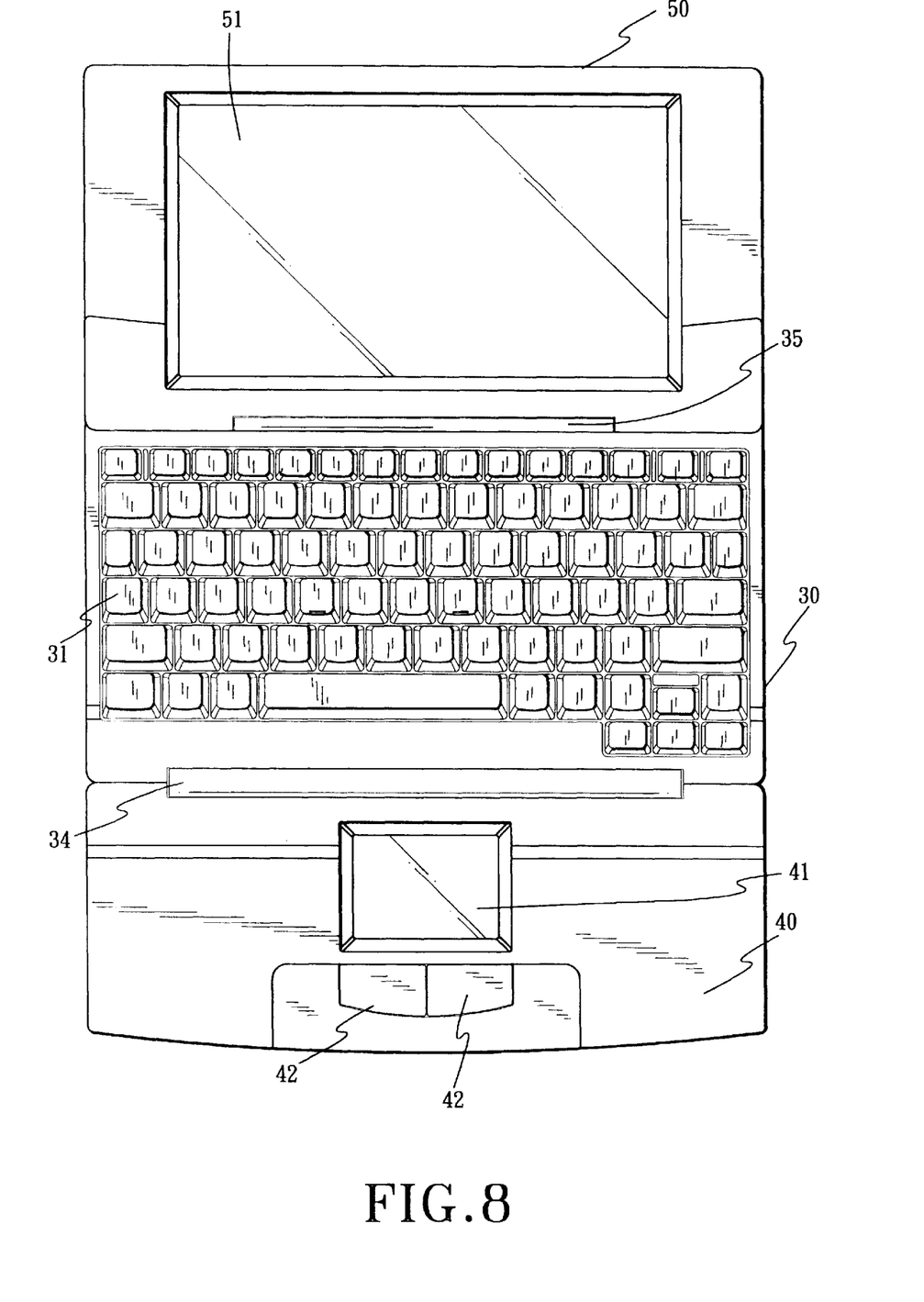
FIG. 8 is a top view of a second preferred embodiment of a foldable data input device according to the present invention in an unfolded position.
Figure 9A:
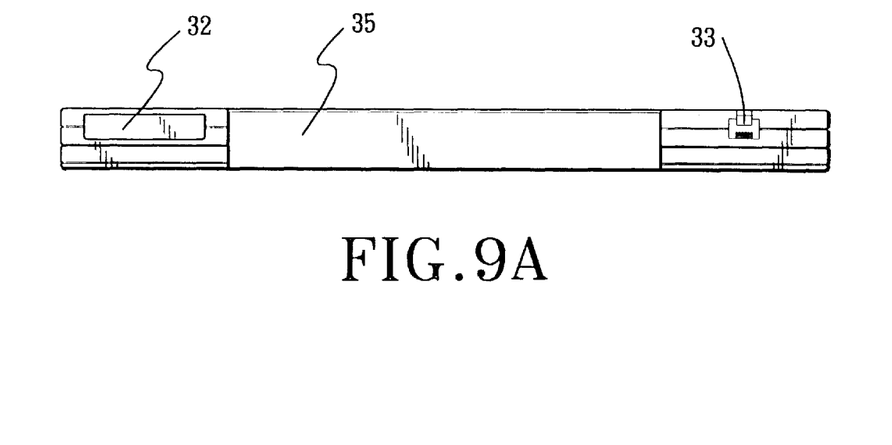
FIG. 9A is a rear view of the second preferred embodiment of the foldable data input device in a folded position.
Figure 9B:
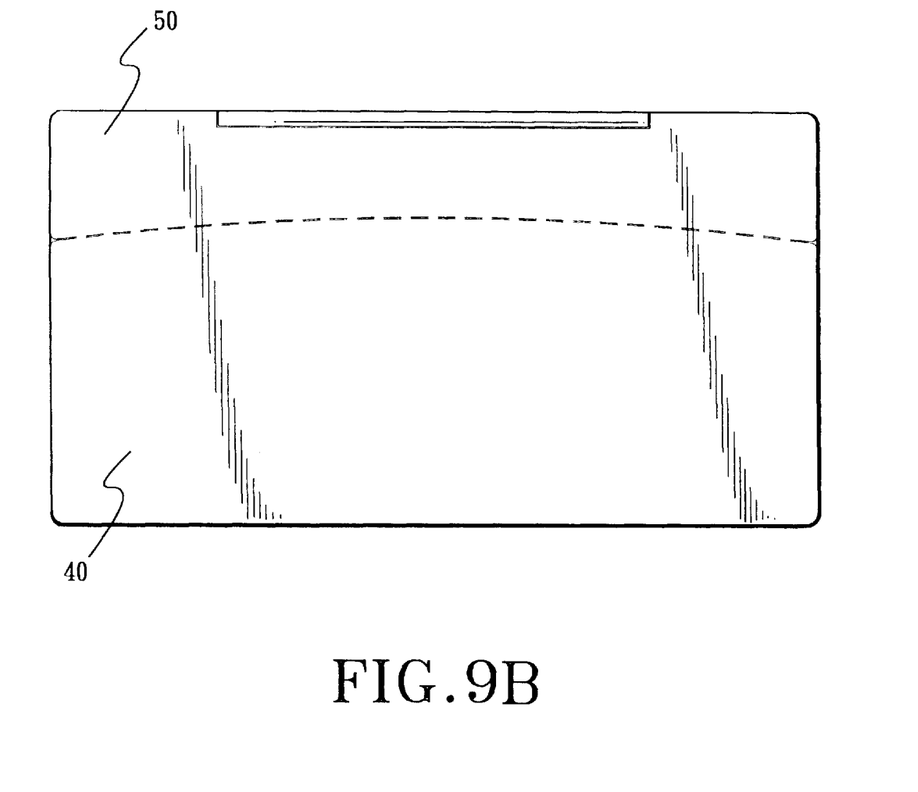
FIG. 9B is a bottom view of the second preferred embodiment of the foldable data input device in a folded position.
Figure 9C:
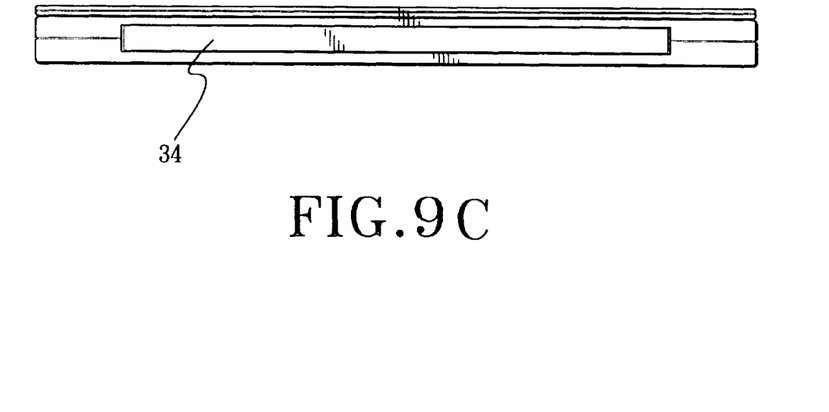
FIG. 9C is a front view of the second preferred embodiment of the foldable data input device in a folded position.
Figure 9D:
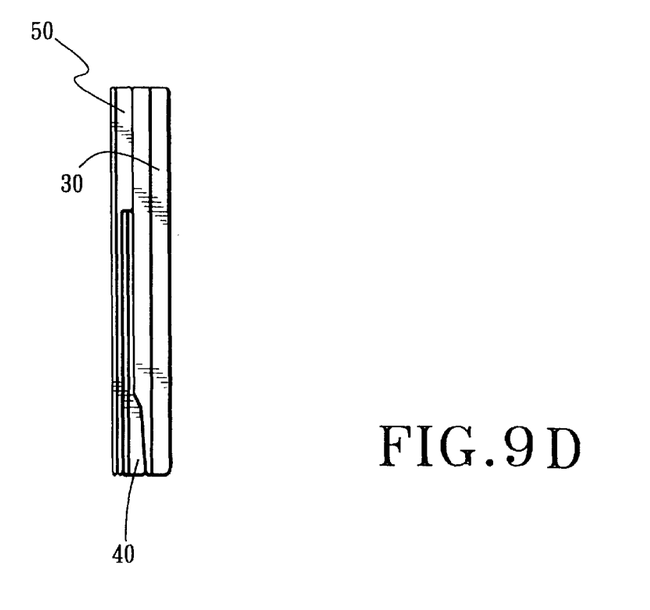
FIG. 9D is a right side view of the second preferred embodiment of the foldable data input device in a folded position.

Referring to FIGS. 6I to 6F and FIG. 7, the second lid 50 can rotate from the top face of the keyboard 30 toward the bottom face of the keyboard 30 in the direction indicated by the arrow (B) about the second hinge device 35 in order to serve as a stand for the keyboard 30.

Figure 4A:
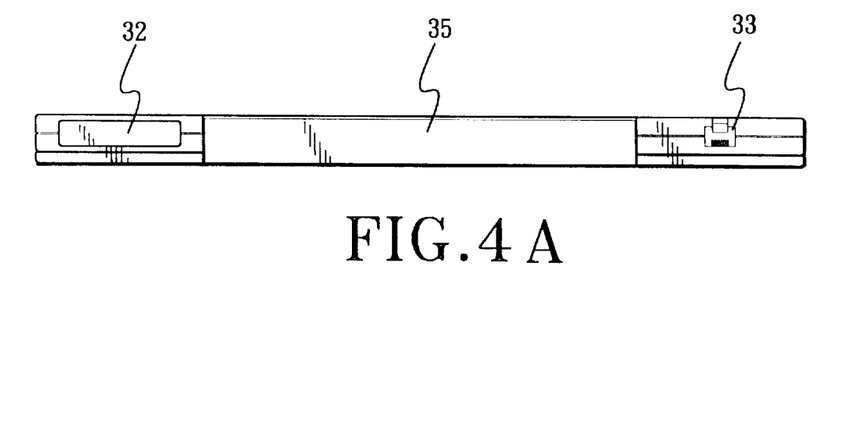
FIG. 4A is a rear view of the preferred embodiment of the foldable data input device in a folded position.
Figure 4B:
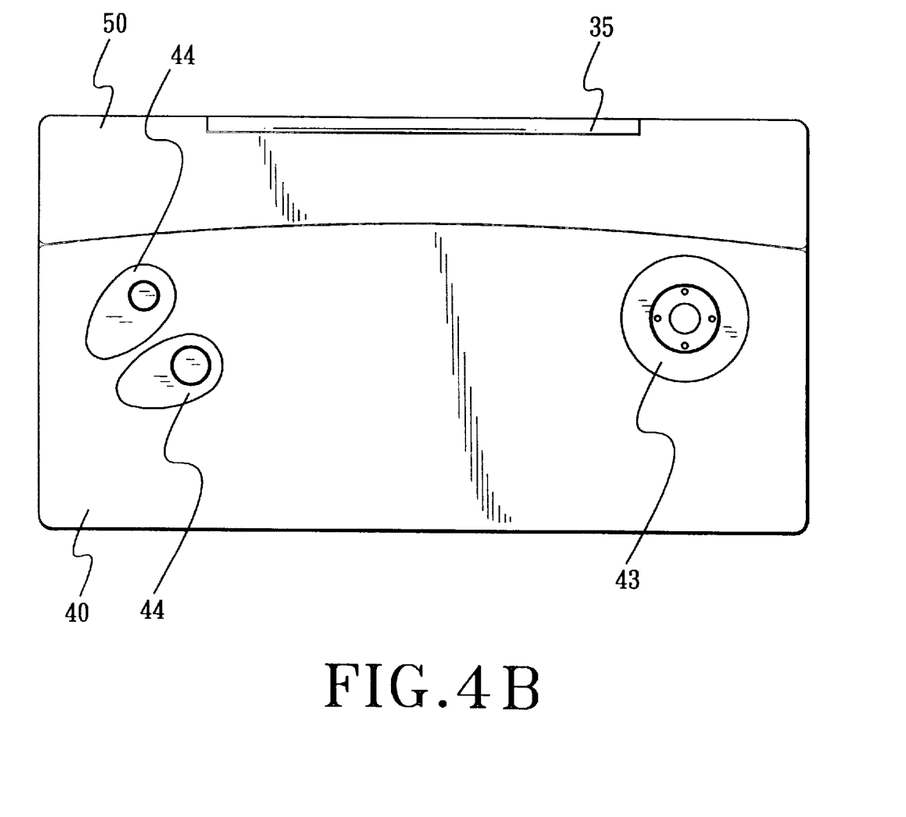
FIG. 4B is a bottom view of the preferred embodiment of the foldable data input device in a folded position.
Figure 4C:
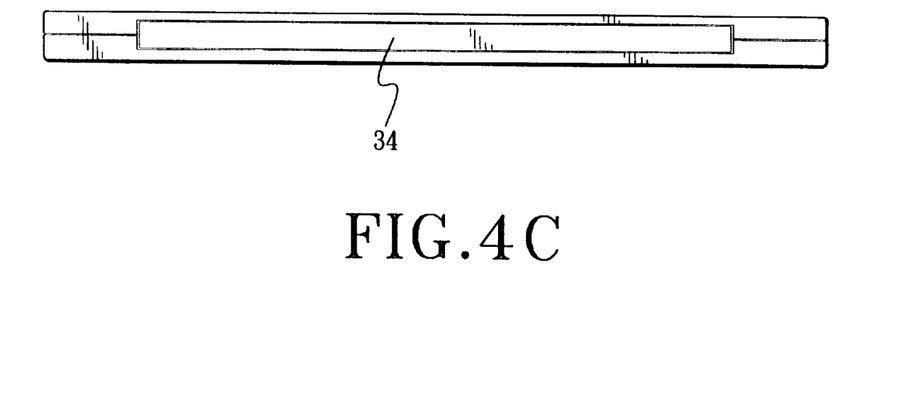
FIG. 4C is a front view of the preferred embodiment of the foldable data input device in a folded position.
Figure 4D:
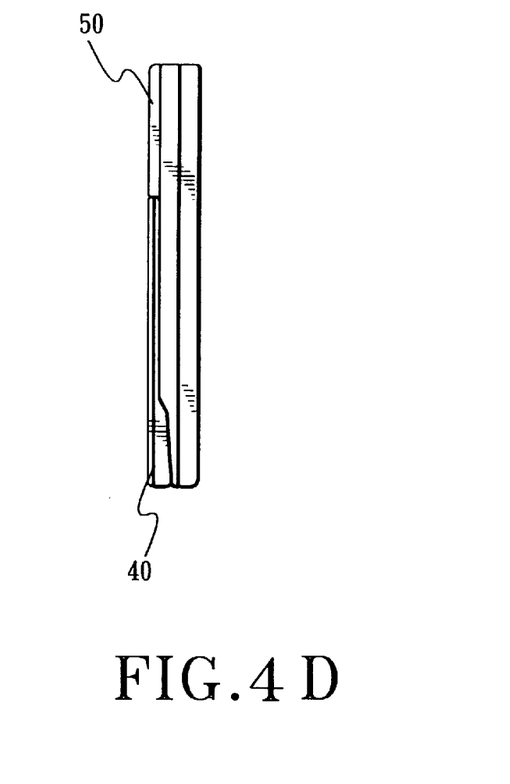
FIG. 4D is a right side view of the preferred embodiment of the foldable data input device in a folded position.

Referring to FIG. 4B, when the first and second lids 40, 50 are folded over the top face of the keyboard 30, the user may manipulate a computer or a conventional digital television by means of the press-type cursor control device 43 and the second selection buttons 44 on the outside face of the first lid 40. When the first lid 40 is rotated from the top face of the keyboard 30 to a horizontal position in the direction indicated by the arrow (A) in FIG. 7 and the second lid 50 is rotated in the direction of the arrow (B) to an unfolded position, the user may manipulate selectively the keys 31 of the keyboard 30, the touch pad 41 and the first selection buttons 42 for signal transmission purposes. In this way, the user can have a number of different ways available for performing input functions by virtue of the foldable input data device of the present invention.

Referring to FIG. 8 and FIGS. 9A to 9D, a second preferred embodiment of a foldable input data device according to the present invention is shown to comprise a keyboard 30, a first lid 40 and a second lid 50. In this embodiment, the second lid 50 has a liquid crystal display 51 provided on the inside face thereof. The second lid 50 is foldable over the first lid 40 and the keyboard 30.

Figure 10:
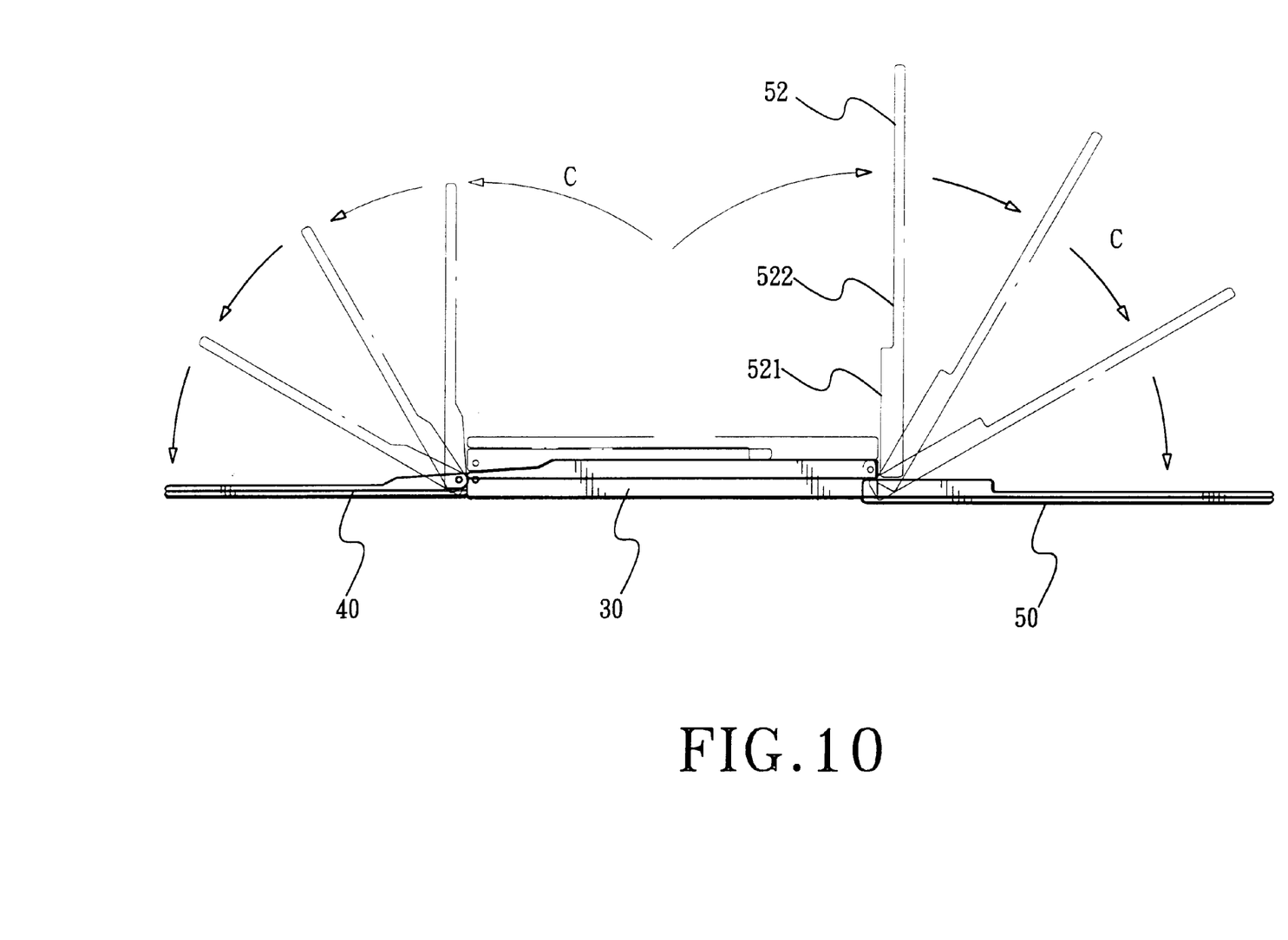
FIG. 10 is a schematic view illustrating the rotation of the first and second lids of the second preferred embodiment.

Referring to FIG. 10, the second lid 50 includes a stepped inside face 52 having a first contact surface 521 and a second contact surface 522 extending in two different planes. The first contact surface 521 serves to confront the top face of the keyboard 30, while the second contact surface 522 cooperates with the top face of the keyboard 30 to form a space to receive the first lid 40 in a folded position of the foldable data input device. In use, the first and second lids 40, 50 can rotate respectively from a folded position to a horizontal unfolded position in the directions indicated by the arrows (C).

When not in use, the first and second lids 40, 50 are folded onto the top face of the keyboard 30. Therefore, the foldable input data device of the present invention is easy to carry and store.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A foldable data input device comprising:
   a keyboard with a top face and opposing first and second side edges, said keyboard having a plurality of keys mounted on said top face thereof and a signal transmission device mounted thereon;
   a first hinge device; and
   a first lid connected pivotally to said first side edge of said keyboard by said first hinge device in order to cover said top face of said keyboard, said first lid having an inside face for confronting said top face, a touch pad and first selection buttons provided on said inside face.

2. The foldable data input device as claimed in claim 1, wherein said signal transmission device comprises an infrared receiver/emitter device.

3. The foldable data input device as claimed in claim 1, wherein said signal transmission device is a cable signal transmission device.

4. The foldable data input device as claimed in claim 1, wherein said first lid further has an outside face, a press-type cursor control device provided on said outside face, and second selection buttons that are operatively associated with said press-type cursor control device and that are provided on said outside face.

5. The foldable data input device as claimed in claim 1, further comprising signal transmission lines connected electrically to said keyboard, said touch pad and said first selection buttons, said first hinge device comprising two pairs of hinge leaves which are disposed between and which are connected pivotally to said first side edge of said keyboard and said first lid, and a pair of elongated guide plates which are disposed between and which are connected to said two pairs of said hinge leaves, said guide plates being fastened to one another and having a gap therebetween for guiding said signal transmission lines.

6. The foldable data input device as claimed in claim 5, wherein said first hinge device further comprises two pairs of pivot pins mounted on two opposite ends of said guide plates, respectively, said hinge leaves being pivoted, respectively, to said opposite ends of said guide plates via said pivot pins.

7. The foldable data input device as claimed in claim 1, further comprising a second hinge device, and a second lid connected pivotally to said second side edges via said second hinge device.

8. The foldable data input device as claimed in claim 7, wherein said second lid is foldable over said top face of said keyboard to lie on the same plane as said first lid.

9. The foldable data input device as claimed in claim 7, wherein said second lid is foldable over said first lid and said keyboard.

10. The foldable data input device as claimed in claim 9, wherein said second lid includes a stepped inside face having a first contact surface and a second contact surface extending in two different planes, said first contact surface serving to confront said top face of said keyboard, said second contact surface confronting with said top face of said keyboard to form a space to receive said first lid in a folded position of said foldable data input device.

11. The foldable data input device as claimed in claim 7, wherein said second lid has an inside face and a liquid crystal display provided on said inside face of said second lid.

* * * * *